United States Patent [19]
Bayley et al.

[11] Patent Number: 5,407,772
[45] Date of Patent: Apr. 18, 1995

[54] UNSATURATED POLYESTERS

[75] Inventors: Robert D. Bayley, Fairport; Carol A. Fox, Farmington; Thomas R. Hoffend, Webster, all of N.Y.; Hadi K. Mahabadi, Mississauga, Canada; Enno E. Agur, Toronto, Canada; Guerino Sacripante, Cambridge, Canada; Michael S. Hawkins, Mississauga, Canada

[73] Assignee: Xerox Corporation, Stamford, Conn.

[21] Appl. No.: 159,176

[22] Filed: Nov. 30, 1993

[51] Int. Cl.$^6$ .............................................. G03G 9/00
[52] U.S. Cl. ................................. 430/109; 528/272; 528/279; 528/283; 528/296; 528/297; 528/298; 528/299; 528/300; 528/301; 528/302; 528/306; 528/307; 528/308; 528/308.6; 430/109; 430/120; 430/137
[58] Field of Search ............... 528/272, 279, 283, 296, 528/297, 298, 299, 300, 301, 302, 306, 307, 308, 308.6; 430/109, 120, 137

[56] References Cited

U.S. PATENT DOCUMENTS

| | | | |
|---|---|---|---|
| 3,590,000 | 6/1971 | Palermiti et al. | 430/110 |
| 3,678,024 | 7/1972 | Liu et al. | 528/481 |
| 3,681,106 | 8/1972 | Burns et al. | 430/120 |
| 4,289,716 | 9/1981 | Voigt | 264/45.9 |
| 4,533,614 | 8/1985 | Fukumoto et al. | 430/99 |
| 5,089,547 | 2/1992 | McCabe et al. | 524/262 |
| 5,112,715 | 5/1992 | DeMejo et al. | 430/109 |
| 5,145,762 | 9/1992 | Grushkin | 430/137 |
| 5,227,460 | 7/1993 | Mahabadi et al. | 528/272 |

FOREIGN PATENT DOCUMENTS

| | | |
|---|---|---|
| 0261585 | 3/1988 | European Pat. Off. |
| 57-81272 | 5/1982 | Japan |
| 58-158651 | 9/1983 | Japan |
| 60-104956 | 6/1985 | Japan |
| 1-038757 | 2/1989 | Japan |

Primary Examiner—Samuel A. Acquah
Attorney, Agent, or Firm—Oliff & Berridge

[57] ABSTRACT

Unsaturated linear polymers have repeating units of a reaction product of a first monomer, a second monomer, a third monomer and optionally a fourth monomer. The linear polymers have a glass transition temperature ranging from about 52° C. to about 61° C. The first monomer should have a weight average molecular weight less than 200. The second monomer may be a dicarboxylic acid or diester which is different than the third monomer. A concentration of second residues of the polymer, derived from the second monomer, ranges from about 3 wt. % to about 15 wt. %, based on the total weight of the polymer. The third monomer is an aromatic dicarboxylic acid or an ester thereof. In the polymer, a concentration of third residues, derived from the third monomer, ranges from about 40 wt. % to about 55 wt. %, based on the total weight of the polymer. The fourth monomer is a diol having a higher molecular weight than the first monomer. In a process for preparing the inventive polymer, the first, second, third monomer (and optionally a fourth monomer) and/or a catalyst undergo transesterification to form the unsaturated, linear polymer.

19 Claims, 4 Drawing Sheets

UNSATURATED POLYESTERS

BACKGROUND OF THE INVENTION

The invention is directed to unsaturated polyester polymers, particularly useful for preparing low-fix temperature, cross-linked toner resins. Toners made from cross-linked resins comprising the inventive unsaturated polyester polymers exhibit desirable low temperature fixing characteristics and offset properties.

BACKGROUND

Conventional electrophotographic processes require temperatures of 160°–200° C. to fix toner on a support medium, e.g., a sheet of paper or transparency, creating a developed image. Such high temperatures may reduce or minimize fuser roll life, such as with fuser rolls made of silicone rubbers or fluoroelastomers (e.g., Viton®), may limit fixing speeds and may necessitate higher power usage during operation, such as in a xerographic copier employing a hot roll fixing mechanism.

Electrophotographic toners are generally prepared by mixing or dispersing a colorant and possibly a charge enhancing additive into a thermoplastic binder resin, followed by micropulverization. Known, conventional thermoplastic binder resins include polystyrenes, styreneacrylic resins, styrene-methacrylic resins, polyesters, epoxy resins, acrylics, urethanes and copolymers thereof. Carbon black is often used as a colorant and alkyl pyridinium halides, distearyl dimethyl ammonium methyl sulfate, and the like are often employed as charge enhancing additives.

Although many processes exist for fixing toner to a support medium, hot roll fixing transfers heat very efficiently and is especially suited for high speed electrophotographic processes. In this method, a support medium carrying a toner image is transported between a heated fuser roll and a pressure roll with the image face contacting the fuser roll. Upon contact with the heated fuser roll, the toner melts and adheres to the support medium to fix an image.

Toner fixing performance may be characterized as a function of temperature. The lowest temperature at which the toner adheres to the support medium is called the cold offset temperature. The maximum temperature at which the toner adheres to the fuser roll is called the hot offset temperature. When the fuser temperature exceeds the hot offset temperature some of the molten toner adheres to the fuser roll during fixing, is subsequently transferred to a substrate (a phenomenon known as "offsetting"), and results for example in blurred images. Between the cold offset temperature and hot offset temperature of the toner is the minimum fix temperature which is the minimum temperature at which acceptable adhesion of the toner to the support medium occurs. The difference between minimum fix temperature and hot offset temperature is called the fusing latitude.

Several problems exist with the hot roll fixing system described above and with toners presently used with the system. First, binder resins in the toners can require a relatively high temperature in order to be affixed to the support medium. A high temperature may result in high power consumption, low fixing speeds, and reduced fuser roll and roll bearing life. Offsetting may present a problem.

Toner resins that have a low fix temperature below 200° C. ("low melt toner resin"), preferably below 160° C., and exhibit good offset temperature performance are desired. Processes for preparing such toner resins are therefore desirable. Toners operating at lower temperatures reduce power needs and increase component life. Low melt toners reduce volatilization of release oil such as silicone oil. Volatilization, which may occur during high temperature operation causes problems when the volatilized oil condenses on other areas of the machine. Toners with wide fusing latitude permit liberal requirements for oil used as a release agent. The toners may provide improved particle elasticity and may minimize copy quality deterioration related to toner offset. Hence, the desirability of low-melt temperature toner resins, particularly for use in hot-roll fixing xerographic processes, is apparent.

Resins having a lower minimum fix temperature have a lower molecular weight than resins having higher minimum fix temperatures. U.S. Pat. No. 3,590,000 to Palermiti et al. and U.S. Pat. No. 3,681,106 to Burns et al. disclose attempts to use polyester resins as a toner binder. Although a minimum fix temperature of polyester binder resins can be lower than resins made from other materials, such as styrene-acrylic and styrene-methacrylic resins, use of polyester resins as toner binder can lead to undesirable lower hot offset temperature. This results in a decreased offset resistance, and a decreased glass transition temperature, possibly negatively impacting toner blocking, which occurs during storage.

Resin structure modification by branching, cross-linking, grafting, etc., using conventional polymerization and condensation reactions, may also improve offset resistance. Burns et al. discloses mixing a trivalent or more polyol or polyacid with monomer to provide non-linear polymer modification. Branching during polycondensation results in improved offset resistance. However, too much branching can result in an increased minimum fix temperature, diminishing any advantage of the modified polymer.

U.S. Pat. No. 4,533,614 to Fukimoto discloses a non-linearly modified low-melting polyester containing: 1) an alkyl-substituted dicarboxylic acid and/or an alkyl-substituted diol; 2) a trivalent or more polycarboxylic acid and/or a trivalent or more polyol; 3) a dicarboxylic acid and 4) an etherated diphenol. The main acid component of the polyester requires 50 mole %, preferably 60 mole % or more, of an aromatic dicarboxylic acid, its analogous anhydride, or other dicarboxylic acids to impart sufficient electrophotographic charge characteristics to a toner made from the resin. Modified polyesters having less than this amount of aromatic acid do not impart sufficient charge characteristics.

Heretofore, efforts to produce substantially lower cost, linear, unbranched polyester polymers, exhibiting rheological properties required for producing high-performing desirable low melt toner resins, have been unsuccessful.

U.S. patent application Ser. No. 07/814,782 discloses linear polyester base resins, which may be subsequently cross-linked by a process as disclosed in U.S. patent application Ser. No. 07/814,641, both to Mahabadi et al. The disclosures of these two U.S. patent applications are entirely incorporated herein by reference. Mahabadi et al. discloses a commercially available poly(propoxylated bisphenol A co-fumarate) having a corresponding bisphenol residue in the polyester backbone. The linear resins disclosed in these references exhibit desirable rheological properties when cross-linked but are quite costly to produce.

To reduce product cost while maintaining an equivalent standard of product quality, the inventors have now developed a lower cost polyester resin, having a different chemical structure than more expensive, commercially available bisphenol based resin products.

SUMMARY OF THE INVENTION

The invention overcomes above-discussed problems in the prior art. The invention provides unbranched, linear polyester polymers, capable of undergoing subsequent cross-linking to obtain high-density, cross-linked toner resins for use in toners having improved performance. Of particular benefit, the inventive resins may be produced at a substantially lower cost. The invention provides a thermoplastic resin for toners, which when cross-linked using known processes exhibits desirable rheological properties, rendering the resin useful as a resin in electrophotographic toners. The cross-linked product of the inventive polymers can be sufficiently fixed at low temperatures (e.g., below 200° C., preferably below 160° C.) by hot roll fixing. In addition, cross-linked resins prepared from inventive polymers exhibit desirable hot offset and glass transition temperatures. The inventive polymers are particularly useful as cross-linked toner resins and exhibit excellent characteristics comparable with more expensive commercially available cross-linked resins.

The inventive polyester polymer is a low cost, unsaturated linear polymer. The linear polymer may be a reaction product of a transesterification or other conventional process. The reaction product is a polymerization reaction product of first, second, third, and optionally fourth, monomers. The reaction product has first, second, third, and optionally fourth, residues derived from each of the first, second, third and fourth monomers, respectively. The inventive polymer has a glass transition temperature ranging from about 52° C. to about 61° C. The polymer has a first residue of a diol having a molecular weight below about 200 and has a second residue from a monomer, which may be a unsaturated dicarboxylic acid, a diester, or an anhydride thereof. The second residue concentration ranges from about 3 wt. % to about 15 wt. %, based on the total weight of the polymer. The third monomer may be an aromatic-dicarboxylic acid, or a diester thereof. The third residue concentration in the polymer ranges from about 40 wt. % to about 50 wt. %, based on the total weight of the polymer.

In a process for preparing the unsaturated, linear polymer, the first, second and third monomers are polymerized at a reaction temperature and for a reaction time to form the inventive linear polymer.

DETAILED DESCRIPTION OF PREFERRED EMBODIMENTS

The inventive unsaturated, linear polymer is a much lower-cost alternative than comparable, commercially available resins. The inventive resin achieves economy without compromising physical properties required of cross-linked toner resins for use in high performing toners. The inventive polymer and cross-linked toner resins made therefrom exhibit rheological behavior comparable with high performing resins. Toners made from the inventive cross-linked resins exhibit desirable low minimum fix temperatures. In addition, the inventive polymer, when cross-linked and incorporated into a toner, exhibits good offset properties and wide fusing latitudes as compared with conventional, more expensive, cross-linked resins. The inventive non-linearly modified, unbranched polymer does not suffer from disadvantages of earlier resins.

Applicants have developed a linear-modified polyester polymer, which when subsequently cross-linked using a representative cross-linking process, such as disclosed for example in Mahabadi et al., does not compromise characteristics required of toners used in conventional hot-roll fixing systems. The low-melt linear polyester polymer has repeating units of a reaction product of a first monomer, a second monomer, a third monomer, and optionally a fourth monomer. The polymer has first, second, third, and optionally fourth residues, derived from each of the first, second, third and fourth monomers, respectively. To provide desirable properties of conventional polyester resins used in toners, the inventive polymer has a glass transition temperature ranging from about 52° C. to about 61° C., preferably 57°–59° C. The first monomer preferably has a weight average molecular weight ($M_w$) less than about 200. The second monomer may be an unsaturated dicarboxylic acid, diester, or a anhydride thereof. The second residue is incorporated into the polymer such that a concentration of the second residue ranges from about 3 wt. % to about 15 wt. %, preferably from about 5 to 8 wt. %, based on the total weight of the polymer. The third monomer may be an aromatic dicarboxylic acid or a diester thereof, which may be different from the second monomer. The aromatic dicarboxyclic acid or diester is incorporated into the polyester polymer such that the third residue (originating from the third monomer) is present in a concentration ranging from about 40 wt. % to about 50wt. %, based on the total weight of the polymer.

The inventive polymers and resulting resins contain residues, of an unbranched, linear aliphatic diol as a first residue in the polyester backbone. The first monomer is reacted with the second monomer and an aromatic dicarboxylic acid or ester (third monomer) to obtain a more cost effective resin having the required rheological properties and physical characteristics.

In the inventive resin, second residues (derived from the second monomer) may be present in a concentration which ranges from about 3 wt. % to about 8 wt. %. The inventive polyester resins have lower concentrations of second residues and are prepared at a lower cost than known linear resins. Toner resins made from the inventive polymers impart unexpected desirable toner blocking performance to toners made from the resulting resins.

The low fix temperature of resins prepared from the inventive polymers is a function of the molecular weight and molecular weight distribution of linear portion. However, the preferred lower molecular weight diols in the inventive polymers may also have an undesirable lowering effect on the polymer's glass transition temperature. The third monomer is incorporated into the polyester backbone to achieve a glass transition temperature that approximates transition temperatures required of conventional polymers. Thus, the inventive polymers do not suffer from poor performance due to an unacceptably low glass transition temperature.

Also, in some of the inventive polyester polymers, the lower cost first residue of the backbone may have a lowering effect on polymer's glass transition temperature, (sometimes to border-line levels). A higher molecular weight alcohol (fourth monomer) may be added to the monomer reaction mixture during preparation to compensate for the lower-weight first residue (diol) component of the polyester backbone. The molecular weight of the fourth monomer should be higher than the molecular weight of the first monomer. To ensure good blocking performance in cross-linked resins prepared from the inventive polymers, the glass transition temperature of the inventive polymers may be raised from about 2° to about 5° C. by additionally incorporating from about 1 to about 20 mole percent, based on the total diol residue in the polyester polymer, of higher molecular weight fourth monomer. The fourth monomer compensates for an undesirably low glass transition temperature without significantly increasing the cost of the inventive polymer.

Exemplary first monomers useful in preparing polymers according to the invention include, but are not limited to 1,2-propane diol, 1,3-butanediol, ethylene glycol, 1,4-butanediol, diethylene glycol, neopentyl glycol, dipropylene glycol, dibromoneopentyl glycol, 2,2,4-trimethylpentane-1,3-diol, 1,4-butanediol and the like and mixtures thereof. The diol residue of the polymer should be present in the inventive polymer in a concentration ranging from 42% to 78%, preferably from about 50–65%, and more preferably from 55–60% by weight, based on the total weight of the resulting polymer.

Exemplary second monomers include, but are not limited to, dicarboxylic acids or esters of dicarboxylic acids, such as for example, maleic acid, maleic anhydride, fumaric acid, chloromaleic acid, itaconic acid, citraconic acid, mesaconic acid, esters thereof and the like.

The concentration of the third residue derived from the third monomer should range from about 40% to about 50% by weight, based on the total weight of the resulting polymer. Too much of the third residue in the final polymer may adversely affect the polymer's rheological properties. Exemplary aromatic dicarboxylic acids and esters of acids used as third monomers in preparing the inventive polymers include, but are not limited to, terephthalic acid, isophthalic acid, phthalic acid, benzophenone-4,4'-dicarboxylic acid, 1,2diphenoxyethane-p,p'-dicarboxylic acid, tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, their esters and the like. A preferred ester of terephthalic acid is dimethyl terephthalate.

Exemplary fourth monomers include, but are not limited to, propoxylated bisphenol A, ethoxylated bisphenol A, tetrabromo bisphenol dipropoxy ether and the like and mixtures thereof. Again, the fourth monomer should have a molecular weight higher than that of the first monomer.

The inventive polymers may be manufactured by step-wise reaction between the first, second and third monomers, preferably with a fourth monomer as described above. The resulting unsaturated polyesters are reactive (e.g., cross-linkable) at: (i) unsaturation sites (double bonds) along the polyester chain, and (ii) functional groups such as carboxyl, hydroxy, etc. groups amenable to acid-base reactions.

In a process for preparing the inventive unsaturated linear polymer, a reaction vessel is used to condense the first and second monomers. The first and second monomers, preferably with the transition monomer and fourth monomer, are placed in the reactor. The monomers are thoroughly mixed to form a homogeneous solution. The solution is heated to a temperature at which a clear melt of the starting monomers is obtained, at which time a catalyst may be added to promote transesterification. Volatile alcohol by-product from transesterification (e.g. methanol or ethanol) is removed from the reaction system until more than 90% of the theoretical volatile alcohol has been removed.

Transesterification catalysts may include, but are not limited to, tetraisopropyl orthotitanate transesterification catalyst, tetrabutyl orthotitanate monobutyl tin oxide (e.g., FASCAT 4100, a registered trademark of M&T Chemicals Inc.), dibutyl tin oxide, and other transesterification catalysts used by those skilled in the art of polyester synthesis. Transesterification temperatures range from about 150 to 250° C., preferably from about 185° C. to about 215° C. Excess diol monomer should be removed under generated vacuum. Total reaction times may range from about 1 to about 5 hours.

Reaction mechanisms for preparing the inventive polymers may include the following mechanisms for an exemplary embodiment of the invention:

Methanol is eliminated and the reaction continues until substantially all of the second monomer or Third monomer has reacted with the first monomer. Since the second monomer is reacted at a far lower concentration than the third monomer, there will be a higher percentage of the third residues in the polymer contributed by the third monomer. The third residue is exemplified structurally as follows:

"n" representing the number of repeating units. The second residue contributed by the second monomer will appear far more randomly in the polymer backbone. The second residue appears in the polymer as n repeating units of the following polymer unit, alternating randomly with the above polymer unit.

Thus, a single exemplary polymer unit of the invention may resemble the following structure, n being the number of polymer repeating units:

The weight average molecular weight, $M_w$, of the inventive polymer, may be in the range of about 5,000 to 20,000 and the number average molecular weight, $M_n$, of the inventive polymer, may be in the range of about 2,000 to about 6,000.

The linear inventive polymer may be cross-linked using known cross-linking reactions.

Densely cross-linked toner resins may be cross-linked by a reactive extrusion process, the resulting resins comprising cross-linked portions and linear portions. Reactively extruded polymer resins of the invention comprise very high molecular weight, densely cross-linked microgel particles, insoluble in substantially any solvent, including tetrahydrofuran, toluene and the like. The linear portion comprises low molecular weight resin soluble in various solvents such as for example tetrahydrofuran, toluene and the like. High molecular weight, highly cross-linked gel particles are substantially uniformly distributed in the linear portions. Substantially no portion of the resin, cross-linked by reactive extrusion, comprises sol (low density cross-linked polymer), such as that which would be obtained in cross-linking processes such as polycondensation, bulk, solution, suspension, emulsion and dispersion polymerization processes.

Resins prepared from the inventive polymers are generally present in a toner made from the inventive polymers in an amount of from about 40 to about 98 percent by weight, and more preferably from about 70 to about 98 percent by weight. They may be present in greater or lesser amounts, provided that the objectives of the invention are achieved. Toner resins prepared from polymers may be subsequently melt blended or otherwise mixed with a colorant, charge carrier additives, surfactants, emulsifiers, pigment dispersants, flow additives, and the like. The toner product can then be pulverized by known methods such as milling to form toner particles. The toner particles preferably have an average volume particle diameter of about 5 to about 25, more preferably about 5 to about 15, microns.

Various suitable colorants can be employed in toners of the invention, including suitable colored pigments, dyes, and mixtures thereof, including Carbon Black, such as Regal 330 ® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF and iron oxides, such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions prepared using the inventive polymers, preferably in an amount of about 0.1 to about 10, more preferably about 1 to about 3, percent by weight. Examples include quaternary ammonium compounds inclusive of alkyl pyridinium halides; alkyl pyridinium compounds; organic sulfate and sulfonate compositions; cetyl pyridinium tetrafluoroborates; distearyl dimethyl ammonium methyl sulfate; aluminum salts such as Bontron E84 TM or E88 TM (Hodogaya Chemical); and the like.

Additionally, other internal and/or external additives may be added in known amounts to impart known functions to the resulting toners. The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The toners or developers made from the inventive polymers can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can be fused to the support by application of heat and/or pressure, for example with a heated fuser roll at a temperature lower than 200° C., preferably lower than 160° C., more preferably lower than 140° C., and more preferably about 110° C.

While the invention has been described with reference to particular preferred embodiments, the invention is not limited to the specific examples given. Other embodiments and modifications can be made by those skilled in the art without departing from the spirit and scope of the invention.

EXAMPLE I

A poly(1,2-propyleneterephthalate/1,2-propylenefumarate) copolymer is prepared by the following procedure. A 3 liter glass reactor is assembled with a stainless steel helical anchor stirrer and high vacuum stirrer bearing adaptor, glass thermometer well and 250° C. thermometer, inert gas inlet adaptor, water-jacketed vigreux column fixed with a Dean Stark trap and condenser, and a full length heating mantle controlled with a 12 R Thermosratch Regulator attached to the thermometer.

1815.77 grams (9.35 moles) of dimethylterephthalate, 1673.98 grams (22.0 moles) of 1,2-propane diol, and 284.13 grams (1.65 moles) of dimethylfumarate are added to the reactor. After the reactor and its contents reach 135° C. by heating with the mantle, a clear melt is obtained. The clear melt is argon sparged for approximately 20 minutes to remove dissolved oxygen. At this point 5.34 grams (0.018 moles) of titanium(IV) isopropoxide transesterification catalyst is added to promote transesterification.

Methanol is then removed by the Dean Stark trap/condenser system until 650 grams of the volatile alcohol (92% theoretical) are removed. At this time the reactor is connected to a high vacuum trap system with two inline dry ice traps, and the reactor contents are raised to 200° C. Vacuum is slowly applied to remove excess 1,2-propane diol, after which full vacuum is obtained at 200 microns. After one hour and 20 minutes, a sample is analyzed and found to have a melt index of 78.0 (grams per ten minutes) at 105° C./2.160 kilograms and a Tg of 54° C., obtained using a Perkin Elmer DSC-4. Gel permeation chromatography of the polymer confirmed a $M_w$ of 6,400, $M_n$ of 3,100 and a MWD of 2.3. The concentration of unsaturated units is approximately 6 wt. % of the resin. The unsaturated, functional units are contributed by the fumarate. At this point the main batch of polymer is removed from the reactor.

Figure 1:
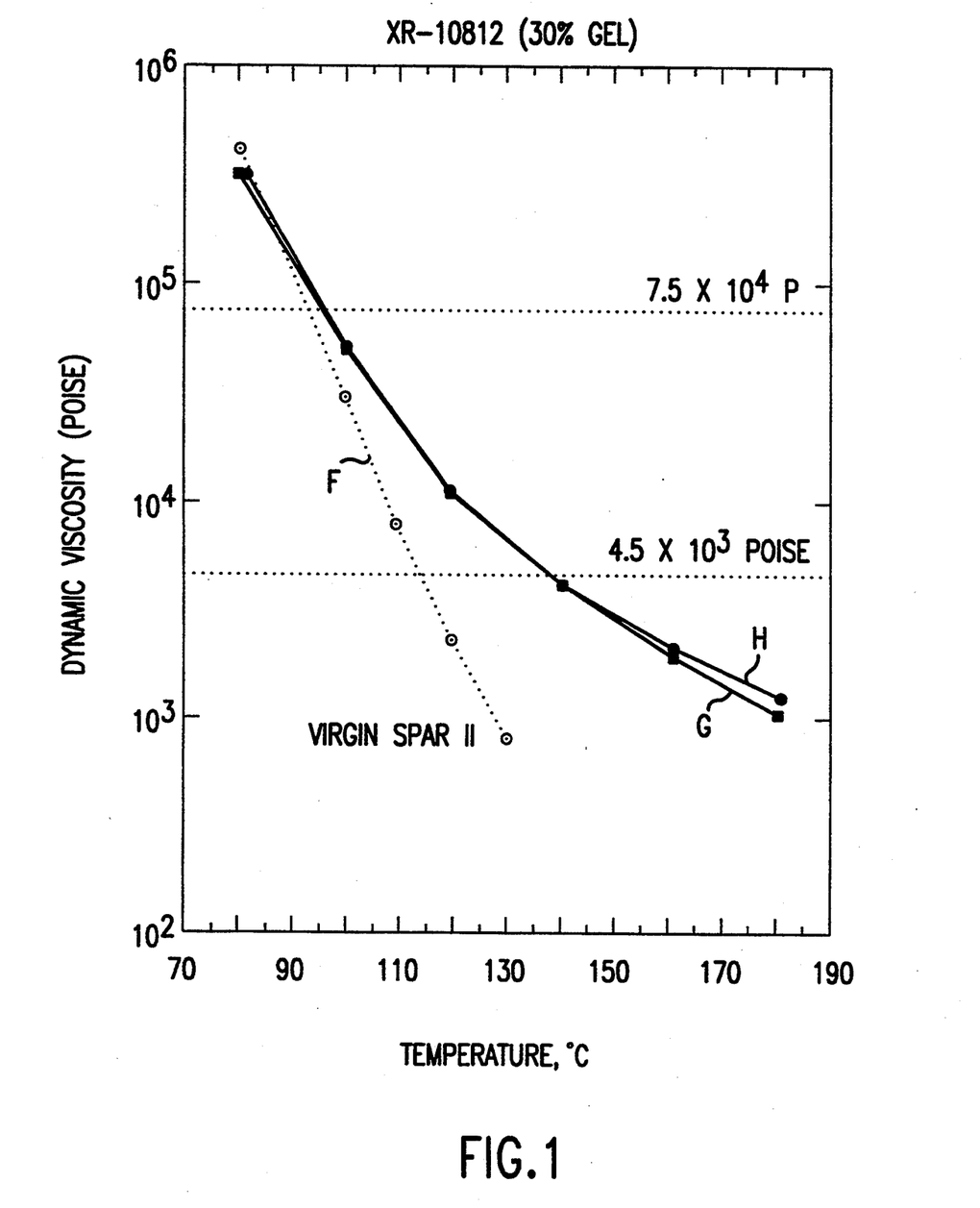
FIG. 1 illustrates rheology curves for a known linear base resin and corresponding cross-linked resins.
Figure 3:
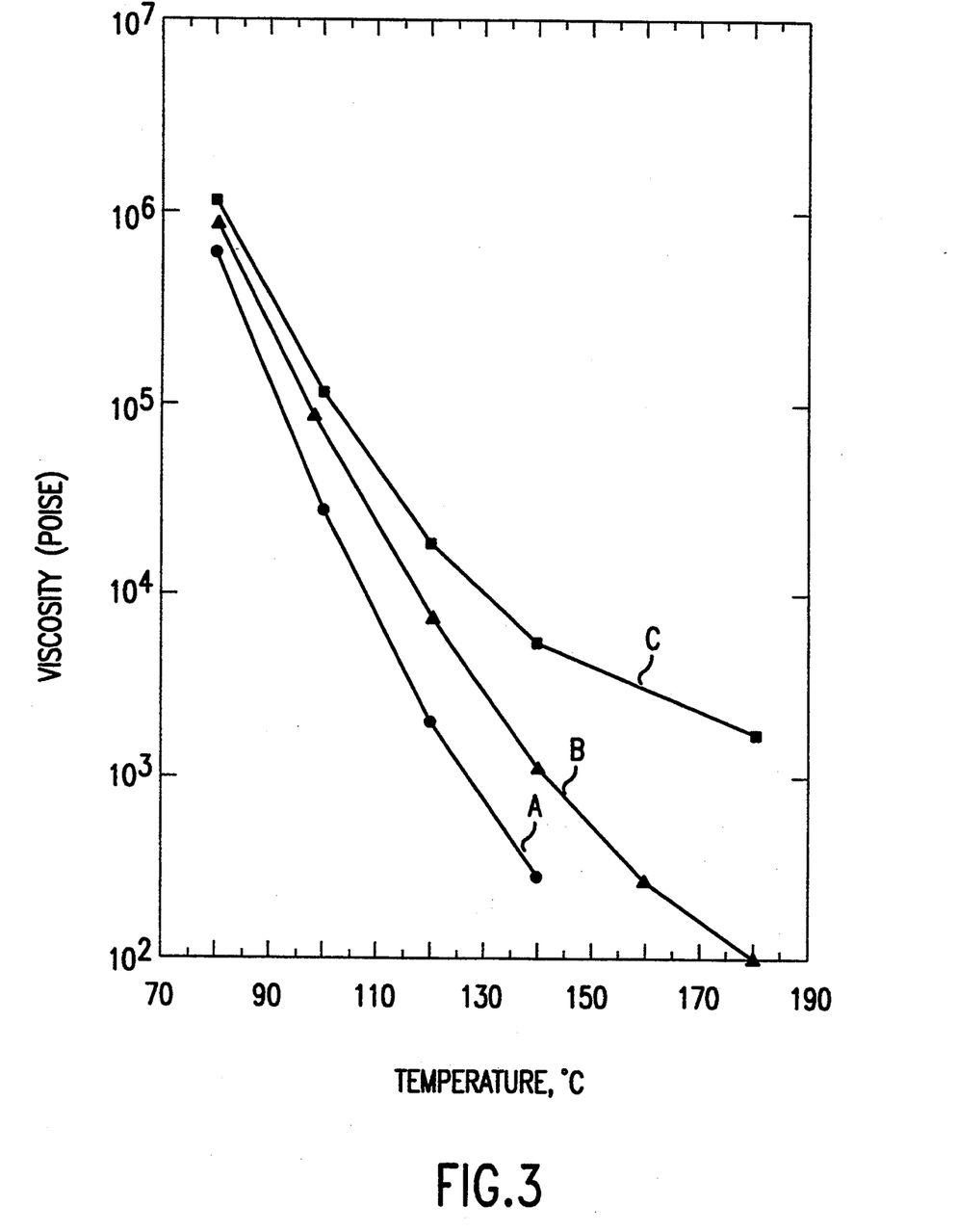
FIG. 3 illustrates rheology curves for an inventive polymer, cross-linked using various percentages of cross-linking initiator.

The polymer is cross-linked using 0.5% and 1.0% benzoyl peroxide cross-linking initiator in a reactive extrusion process as disclosed in Mahabadi et al., supra and rheology data is measured and plotted for the linear and cross-linked polymers as shown in FIG. 3. Rheology plot A represents viscosity of the inventive polymer. Rheology plot B represents viscosity of a resin of the inventive polymer cross-linked using 0.5% benzoyl peroxide at 160° C. The cross-linked resin exhibits higher viscosity at higher temperature. Similarly, the rheology plot C represents viscosity of a resin of the inventive polymer, cross-linked using 1.0% benzoyl peroxide. The effect of a higher benzoyl peroxide concentration results in a higher viscosity at higher temperatures. The results indicate resin performance consistent with desired values for low-fix temperature conventional toner resins, shown in FIG. 1. In FIG. 1, curve F represents rheology of a commercially available linear resin. Curves G and H are plotted rheology data for cross-linked, conventional polyester polymers.

EXAMPLE II

A poly(1,2-propyleneterephthalate/1,2-propylenefumarate) polymer is prepared by the procedure of Example I using the conditions discussed therein except that 1481 grams (19.7 moles) of 1,2-propane diol, 2142 grams (11.03 moles) of dimethylterephthalate and 397.8 grams (2.76 moles) of dimethylfumarate are added to the reactor and mixed while heating to obtain the clear melt. The clear melt is argon sparged for approximately 20 minutes to remove dissolved oxygen. At this point 6.31 grams (0.022 moles) of titanium(IV) isopropoxide transesterification catalyst is added to promote transesterification.

Figure 4:
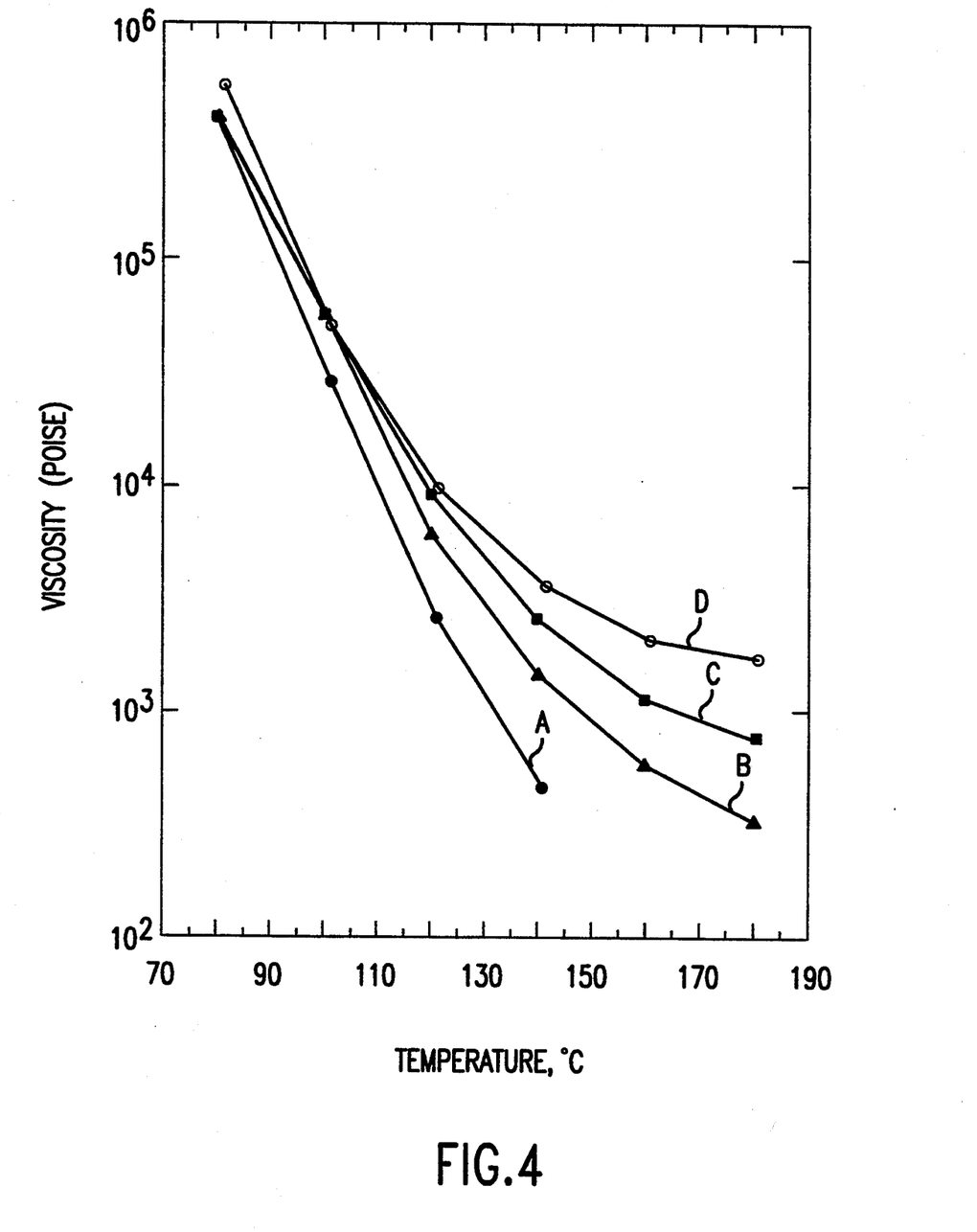
FIG. 4 illustrates rheology curves for an alternative, preferred embodiment of the inventive polymer, cross-linked using varying amounts of a cross-linking initiator.

Methanol is then removed by the Dean Stark trap/condenser system until 650 grams of the volatile alcohol (83% theoretical) are removed. At this time the reactor is connected to a high vacuum trap system with two inline dry ice traps, and the reactor contents are raised to 200° C. Vacuum is slowly applied to remove excess 1,2-propane diol, after which full vacuum is obtained at about 200 microns. Analysis reveals that the resulting linear polyester polymer has a glass transition temperature of 52° C. and a melt index of 101 at 117° C. per 2.160 kilograms. Gel permeation chromatography of the polymer confirms a $M_w$ of 7,500, $M_n$ of 2,600 and a MWD of 2.88. The concentration of unsaturated units is approximately 8 wt. % of the resin. The unsaturated, functional units are contributed by the fumarate. The polymer is cross-linked using reactive extrusion and rheological tests are conducted. Data measured and plotted is shown in FIG. 4. Rheology plots B, C and D represent viscosities of resins cross-linked using 0.25%, 0.3% and 0.5% benzoyl peroxide, respectively, in the reactive extrusion processes. A higher percentage of benzoyl peroxide yields denser cross-linking and, thus, increased viscosities at higher temperatures. The rheological features of the inventive copolymer patterns favorably compare with conventional resins, again as shown in FIG. 1.

EXAMPLE III

A commercially prepared poly(propoxylated bisphenol A-cofumarate) polymer, refered to as virgin Spar II, is shown here for comparison. The resin was found to have a melt index of 52 grams per ten minutes at 117° C./2.160 Kg and a Tg of 55.4° C., as measured on a Perkin Elmer DSC-4. Gel permeation chromatography of the polymer confirmed a $M_w$ of 13,200, $M_n$ of 6,200 and a MWD of 2.1. This polymer is representative of a commercialy prepared poly(propoxylated bisphenol A fumarate) polymer.

EXAMPLE IV

COMPARATIVE EXAMPLE

A laboratory prepared polymer of poly(propoxylated bisphenol A fumarate) is synthesized by the following procedure. A 3 liter glass reactor is assembled with the reaction system components as specified in Example I. To the reactor is added 1613.00 grams (4.689 moles) of propoxylated bisphenol A (SYNFAC 8029 obtained from Milliken Chemicals), and 557.0 grams (4.798 moles) of fumaric acid. After the reactor and its contents reach 135° C., the obtained slurry is argon sparged for approximately 20 minutes to remove dissolved oxygen. Heating is allowed to continue to approximately 190° C.

Water from esterification is removed using the Dean Stark trap/condenser system until 145 grams (about 74% of theoretical) of water is removed. At this time the reactor is connected to the high vacuum trap system with two inline dry ice traps and the reactor contents raised to 200° C. A vacuum is slowly applied and maintained at about 50 microns. After three hours and twenty minutes, the resin is removed from the reactor. Upon analysis it has a melt index of 62 grams per ten minutes at 117° C./2.160 Kg and a Tg of 55° C. as measured on a Perkin Elmer DSC-4. Gel permeation chromatography of the polymer confirms a $M_w$ of 15,000, $M_n$ of 3,900 and a MWD of 3.8.

Figure 2:
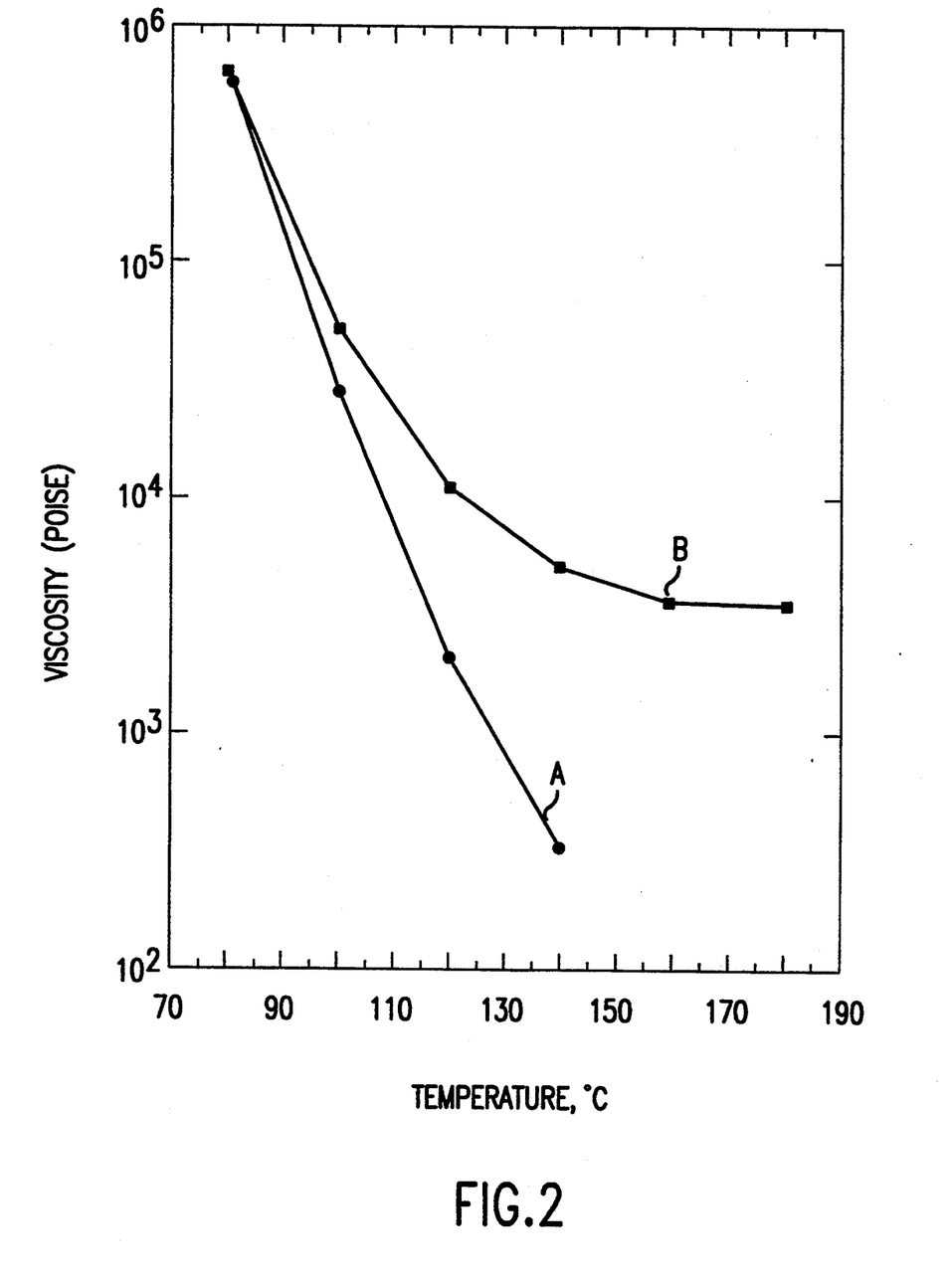
FIG. 2 illustrates a rheology curve for a control linear polymer used as a source of comparative data and rheology curves for corresponding cross-linked resins.

Rheology results of the comparative polymer and corresponding cross-linked resins, cross-linked in a reactive extrusion process, are illustrated in FIG. 2. Rheology of the comparative resin and uncross-linked comparative polymer parallels that of resins prepared using the inventive polymers. Rheology plot A corresponds to viscosity of the uncross-linked polymer at various temperatures. Rheology plot B corresponds to viscosity of the cross-linked comparative polymer using 0.25% benzoyl peroxide at 160° C. in a reactive extrusion process.

EXAMPLE V

A poly(1,2-propyleneterephthalate/1,2-propylenefumarate) polymer is prepared by the procedure in Example I using the conditions discussed therein except that 1481 grams (19.7 moles) of 1,2-propane diol, 2142 grams (11.03 moles) of dimethylterephthalate and 397.8 grams (2.76 moles) of dimethylfumarate are added to the reactor and mixed while heating to obtain the clear melt. The clear melt is argon sparged for approximately 20 minutes to remove dissolved oxygen. At this point 6.31 grams (0.0222 moles) of titanium(IV) isopropoxide transesterification catalyst is added to promote transesterification.

Methanol is removed by the Dean Stark trap/condenser system until 650 grams of the volatile alcohol (95% theoretical) are removed. At this time the reactor is connected to a high vacuum trap system with two inline dry ice traps, and the reactor contents are raised to 200° C. Vacuum is slowly applied to remove excess 1,2-propane diol, after which full vacuum is obtained at about 100 microns. During one hundred forty eight minutes of total vacuum, one sample is taken at 127 minutes, and another sample at the end of the total vacuum time. The first sample is found to have a melt index of 20.8 grams per ten minutes at 117° C./2.160 Kg and a Tg of 58.5° C., as measured on a Perkin Elmer DSC-4. Gel permeation chromatography of the polymer confirms a $M_w$ of 8,400, $M_n$ of 3,100 and a MWD of 2.7. The last sample, which is the bulk of the polymer, has a melt index of 9.4 grams per ten minutes at 117° C./2.160 Kg and a Tg of 61.3° C., as measured on a Perkin Elmer DSC-4. Gel permeation chromatography of the polymer confirms a $M_w$ of 10,000, a $M_n$ of 3,800 and a MWD of 2.6. The concentration of unsaturated units is approximately 8 wt. % of the resin. These unsaturated, functional units are contributed by the fumarate. These polymers represent lower melt index properties and higher Tg resins that are capable of being crosslinked by reactive extrusion methods as in Example I & II.

EXAMPLE VI

An unsaturated-polyester of propoxylated bisphenol A and 1,2-propane diols is prepared by the procedure in Example I using the conditions discussed therein except that 1346 grams (17.58 moles) of 1,2-propane diol, 1606 grams (8.27 moles) of dimethylterephthalate, 364 grams (2.07 moles) of diethylfumarate and 534 grams (1.55 moles) of propoxylated bisphenol A (SYNFAC 8029 obtained from Milliken Chemicals), are added to the reactor and mixed while heating to obtain a clear melt. The clear melt is argon sparged for approximately 20 minutes to remove dissolved oxygen. At this point 5.83 grams (0.0205 moles) of titanium(IV) isopropoxide transesterification catalyst is added to promote transesterification.

Methanol and ethanol byproduct is removed by the Dean Stark trap/condenser system until 95% theoretical is obtained. At this time the reactor is connected to a high vacuum trap system with two inline dry ice traps, and the reactor contents are raised to 200° C. Vacuum is slowly applied to remove excess 1,2-propane diol, after which full vacuum is obtained at about 400 microns. After two hours and twenty four minutes of vacuum, the polymer is removed from the reactor. Upon characterization the polymer is found to have a melt index of 84.0 grams per ten minutes at 117° C./2.160 Kg and a Tg of 54.5° C., as measured on a Perkin Elmer DSC-4. Gel permeation chromatography of the polymer confirms a $M_w$ of 7,500, $M_n$ of 2,700 and a MWD of 2.7. The concentration of unsaturated units is approximately 8 wt. % of the resin. These unsaturated, functional units are contributed by the fumarate. The resin is capable of being crosslinked by reactive extrusion methods as in Example II.

EXAMPLE VII

An unsaturated-polyester is prepared using both 1,2-propane diol, and 1,3-butane diol by the procedure in Example I. Using the conditions discussed in Example I, 1481.0 grams (19.47 moles) of 1,2-propane diol, 2142.0 grams (11.03 moles) of dimethylterephthalate, 397.8 grams (2.76 moles) of dimethylfumarate and 111.0 grams (1.23 moles) of 1,3-butane diol, are added to a reactor and mixed while heating to obtain a clear melt. The clear melt is argon sparged for approximately 20 minutes to remove dissolved oxygen. At this point 6.21 grams (0.0218 moles) of titanium(IV) isopropoxide transesterification catalyst is added to promote transesterification.

Methanol byproduct is removed by the Dean Stark trap/condenser system until 86.8% theoretical is obtained. At this time the reactor is connected to a high vacuum trap system with two inline dry ice traps, and the reactor contents are raised to 200° C. Vacuum is slowly applied to remove excess diols, after which full vacuum is obtained at about 110 microns. After three hours and fifty five minutes of total vacuum, the polymer is removed from the reactor. Upon characterization the polymer is found to have a melt index of 50.5 grams per ten minutes at 117° C./2.160 Kg and a Tg of 56.0° C., as measured on a Perkin Elmer DSC-4. Gel permeation chromatography of the polymer confirms a $M_w$ of 9,100, $M_n$ of 3,500 and a MWD of 2.6. The concentration of unsaturated units is approximately 8 wt. % of the resin. These unsaturated, functional units are contributed by the fumarate. The resin is capable of being crosslinked by reactive extrusion methods as in Example II.

EXAMPLE VIII

An unsaturated-polyester is prepared using 1,2-propane diol, ethanediol, dimethyl terephthalate and dimethylfumarate.

Dimethyl terephthalate (1692 g), dimethylfumarate (208 g), 1,2-propanediol (1641 g), 1,2-ethanediol (148.8 g) and Fascat (3.2 g) are charged into a 7.6 liter Parr reactor equipped with a double turbine agitator and distillation aparatus. The reactor is heated to 165° C., and stirred at 200 rpm, followed by increasing the temperature slowly to 180° C. over a 3 hour period, during which 545 grams of methanol is collected in the distillation receiver. The mixture is then heated to 190° C. over a 1 hour period, followed by decreasing the pressure to 0.5 millibarrs over a 3 hour period, during which time an additional 664 grams of byproduct is collected in the distillation receiver. The reactor is then pressurized to atmospheric pressure with $CO_2$, and the product is discharged through the bottom drain valve into a metal dish. After the product is cooled to room temperature, the glass transition temperature of the unsaturated polyester is found to be 57.8° C.

EXAMPLE IX

An unsaturated-polyester is prepared using 1,2-propane diol., ethanediol, terephthalic acid and fumaric acid.

Terephthalic acid (564 g), fumaric acid (69.6 g), 1,2-ethanediol (49.6 g), 1,2-propanediol (547.2 g) and Fascat (3.2 g) are charged into a Hoppes 2 liter pressure reactor equipped with a helical agitator and distillation aparatus. The mixture is heated to 240° C. under 420 killopascal pressure utilizing $CO_2$ gas. The mixture is stirred at 60 rpm for 4 hours, followed by decreasing the temperature to 220° C., and pressure to atmospheric pressure over a four hour period. The reactor pressure is then decreased to 0.5 millibarrs over a 3 hour period, during which time an additional 664 grams of byproduct is collected in the distillation receiver. The reactor is then pressurized to atmospheric pressure with $CO_2$, and the product is discharged through the bottom drain valve into a metal dish. After the product is cooled to room temperature, the glass transition temperature of the unsaturated polyester is found to be 52° C.

EXAMPLE X

An unsaturated-polyester is prepared using 1,2-propane diol., ethanediol, terephthalic acid and fumaric acid.

Terephthalic acid (564 g), fumaric acid (69.6 g), 1,2-ethanediol (49.6 g), 1,2-propanediol (547.2 g) and Fascat (3.2 g) are charged into the Hoppes 2 liter pressure reactor equipped with a helical agitator and distillation aparatus. The mixture is heated to 240° C. under 420 killopascal pressure utilizing $CO_2$ gas. The mixture is stirred at 60 rpm for 4 hours, followed by decreasing the temperature to 220° C., and pressure to atmospheric pressure over a four hour period. The reactor pressure is then decreased to 0.5 millibarrs over a 3 hour period, during which time an additional 664 grams of byproduct is collected in the distillation receiver, followed by maintaining the pressure at 0.5 millibarrs for an additional hour. The reactor is then pressurized to atmospheric pressure with $CO_2$, and the product is discharged through the bottom drain valve into a metal dish. After the product is cooled to room temperature, the glass transition temperature of the unsaturated polyester is found to be 62° C.

EXAMPLE XI

A Black toner composition of 94 percent by weight crosslinked polyester, derived from the unsaturated polyester resin of Example VIII, with benzoyl peroxide and with 6 percent by weight of Regal 330 black pigment, is prepared as follows.

The unsaturated polyester resin of Example VIII (58 grams) and benzoyl peroxide L-78 (0.85 g) is charged into a Haake melt mixer B-135 available from HBI System. The melt mixer is then heated to 160° C. at a rotational mixing speed of 100 revolutions per minute for a duration of 15 minutes. The reaction mixture is then cooled to room temperature. The crosslinked polyester is then milled in a coffee blender with 3.7 grams of Regal 330, and heated in the Haake melt mixer to 120° C. at 100 rpm for a duration of 15 minutes. The composite mixture is cooled to room temperature, and milled broken into coarse particles utilizing a coffee bean grinder available from Black and Decker. An 8 inch Strutevent micronizer is used to reduce the particle size further. After grinding, the toner is measured to display an average volume diameter particle size of 7.8 microns with a geometric distribution of 1.39 as measured by the Coulter Counter. The resulting toner is then utilized without further classification.

A developer composition is prepared by roll milling the aforementioned toner, 3 parts by weight, with 100 parts by weight of carrier having a steel core with polyvinylidene polymer coating. Tribo data is obtained using the known blow-off Faraday Cage apparatus. The toner developer is subjected to 20 percent humidity in a chamber for 48 hours, and to 80 percent humidity level in a chamber for 48 hours. The ratio of the corresponding triboelectric charge at 20 percent RH to 80 percent RH as given by equation 1, is measured to be 2.3 . Unfused copies were then produced using a Xerox Corporation 1075 imaging aparatus with the fusing system disabled. The unfused copies are then fused on a 1075 fuser using a process speed of 11.9 inches per second. Fusing evaluation of the toner indicates a minimum fixing temperature of about 140° C., and hotoffset temperature of 175° C.

EXAMPLE XII

A Black toner composition of 94 percent by weight crosslinked polyester, derived from the unsaturated polyester resin of Example IX, with benzoyl peroxide and with 6 percent by weight of Regal 330 black pigment, is prepared as follows.

The unsaturated polyester resin of Example IX (58 grams) and benzoyl peroxide L-78 (0.85 g) are charged into a Haake melt mixer B-135 available from HBI System. The melt mixer is heated to 160° C. at a rotational mixing speed of 100 revolutions per minute for a duration of 15 minutes. The reaction mixture is then cooled to room temperature. The crosslinked polyester is then milled in a coffee blender with 3.7 grams of Regal 330, and heated in the Haake melt mixer to 120° C. at 100 rpm for a duration of 15 minutes. The composite mixture is then cooled to room temperature, and milled broken into coarse particles utilizing a coffee bean grinder available from Black and Decker. An 8 inch Strutevent micronizer is used to reduce the particle size further. After grinding, the toner is measured to display an average volume diameter particle size of 6.9 microns with a geometric distribution of 1.38 as measured by the Coulter Counter. The resulting toner is then utilized without further classification.

A developer composition is prepared by roll milling the aforementioned toner, 3 parts by weight, with 100 parts by weight of a carrier of steel core with polyvinylidene polymer coating. Tribo data is obtained using the known blow-off Faraday Cage apparatus, and the toner developer is subjected to 20 percent humidity in a chamber for 48 hours, and to 80 percent humidity level in a chamber for 48 hours. The ratio of the corresponding triboelectric charge at 20 percent RH to 80 percent RH as given by equation 1, is measured to be 2.3. Unfused copies are produced using a Xerox Corporation 1075 imaging aparatus with the fusing system disabled. The unfused copies are then fused on a 1075 fuser using a process speed of 11.9 inches per second. Fusing evaluation of the toner indicates a minimum fixing temperature of about 134° C., and hot-offset temperature of 165° C.

EXAMPLE XIII

A Black toner composition of 94 percent by weight crosslinked polyester, derived from the unsaturated polyester resin of Example X, with benzoyl peroxide and with 6 percent by weight of Regal 330 black pigment, is prepared as follows.

The unsaturated polyester resin of Example X (58 grams) and benzoyl peroxide L-78 (0.85 g) are charged into a Haake melt mixer B-135 available from HBI System. The melt mixer is heated to 160° C. at a rotational mixing speed of 100 revolutions per minute for a duration of 15 minutes. The reaction mixture is cooled to room temperature. The crosslinked polyester is milled in a coffee blender with 3.7 grams of Regal 330, and heated in the Haake melt mixer to 120° C. at 100 rpm for a duration of 15 minutes. The composite mixture is cooled to room temperature, and mill broken into coarse particles utilizing a coffee bean grinder available from Black and Decker. An 8 inch Strutevent micronizer is used to reduce the particle size further. After grinding, the toner is measured to display an average volume diameter particle size of 8.1 microns with a geometric distribution of 1.36 as measured by the Coulter Counter. The resulting toner is utilized without further classification.

A developer composition is prepared by roll milling the aforementioned toner, 3 parts by weight, with 100 parts by weight of a carrier of steel core with polyvinylidene polymer coating. Tribo data is obtained using the known blow-off Faraday Cage apparatus, and the toner developer is subjected to 20 percent humidity in a chamber for 48 hours, and at 80 percent humidity level in a chamber for 48 hours. The ratio of the corresponding triboelectric charge at 20 percent RH to 80 percent RH, is measured to be 2.3. Unfused copies are then produced using a Xerox Corporation 1075 imaging apparatus with fusing system disabled. The unfused copies are fused on a 1075 fuser using a process speed of 11.9 inches per second. Fusing evaluation of the toner indicates a minimum fixing temperature of about 147° C., and hot-offset temperature of 180° C.

What is claimed is:

1. A low fix temperature toner comprising colorant and toner resin consisting essentially of high density cross-linked microgel particles and linear polymer, said toner resin being prepared from an unsaturated linear polymer comprising: a reaction product comprising first residues of a first monomer, second residues of a second monomer and third residues of a third monomer, said first monomer being a diol having a molecular weight below about 200, said second monomer being selected from the group consisting of dicarboxylic acids and diesters, and said third monomer being different from said second monomer and selected from the group consisting of aromatic dicarboxylic acids and diesters; a concentration of said second residues ranging from about 3 to about 15 wt. %, based on a total weight of the polymer, and a concentration of said third residues ranging from about 40 to about 50 wt. %, based on a total weight of the polymer; said polymer having a glass transition temperature ranging from about 52° C. to about 61° C.

2. The low fix temperature toner according to claim 1, wherein the polymer has a weight average molecular weight, $M_w$, in the range of about 5,000–20,000 and a number average molecular weight, $M_n$, in the range of about 2,000–6,000.

3. The toner according to claim 1, wherein the glass transition temperature ranges from about 57° C. to about 59° C.

4. The toner according to claim 1, wherein the concentration of second residues in the polymer ranges from about 5 wt. % to about 8 wt. %, based on the total weight of the polymer.

5. The toner according to claim 1, wherein the concentration of first residues in the polymer ranges from about 42 wt. % to about 78 wt. %, based on the total weight of the polymer.

6. The toner according to claim 4, wherein the first residue concentration ranges from about 50 wt. % to about 65 wt. % based on the total weight of the polymer.

7. The toner according to claim 4, wherein the first residue concentration ranges from about 55 wt. % to about 60 wt. % based on the total weight of the polymer.

8. The toner according to claim 1, wherein the first monomer is selected from the group consisting of 1,2-propane diol, 1,3-butane diol, ethylene glycol, 1,4-butane diol, diethylene glycol, neopentyl glycol, dipropylene glycol, dibromo neopentyl glycol, 2,2,4-trimethyl pentane-1,3-diol and mixtures thereof.

9. The toner according to claim 1, wherein the second monomer is selected from the group consisting of maleic acid, maleic anhydride, fumaric acid, chloromaleic acid, itaconic acid, citraconic acid, mesaconic acid and esters and anhydrides thereof.

10. The toner according to claim 1, wherein the third monomer is selected from the group consisting of terephthalic acid, isophthalic acid, phthalic acid, benzophenone-4,4'-dicarboxylic acid, 1,2-diphenoxyethane-p,p'-dicarboxylic acid, naphthalene dicarboxylic acid, tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromo phthalic anhydride and esters thereof.

11. The toner according to claim 1, wherein the first monomer is 1,2-propane diol, the second monomer is diethyl fumarate and the third monomer is dimethyl terephthalate.

12. The toner according to claim 1, wherein the polyester toner resin is substantially free of sol.

13. The toner according to claim 1, further comprising from about 1 to about 20 mole percent, based on a total diol residue in the polymer, of fourth residues derived from a fourth monomer being a diol having a higher molecular weight than said first monomer.

14. The toner according to claim 13, wherein the fourth monomer is selected from the group consisting of propoxylated bisphenol A, ethoxylated bisphenol-A, tetrabromo bisphenol dipropoxy ether, and mixtures thereof.

15. The toner according to claim 13, wherein the first monomer is 1,2-propane diol, the second monomer is diethyl fumarate, the third monomer is dimethyl terephthalate and the fourth monomer is propoxylated bisphenol A.

16. The toner according to claim 13, wherein the first monomer is 1,2-propane diol, the second monomer is diethyl fumarate, the third monomer is dimethyl terephthalate and the fourth monomer is 1,3-butane diol.

17. The toner according to claim 13, wherein the first monomer is 1,2-ethane diol, the second monomer is diethyl fumarate, the third monomer is dimethyl terephthalate and the fourth monomer is 1,2-propane diol.

18. The toner according to claim 1, wherein the toner has a minimum fix temperature below about 200° C.

19. The toner according to claim 1, wherein the toner has a minimum fix temperature below about 160° C.

* * * * *